United States Patent
Carrillo et al.

(10) Patent No.: US 11,236,716 B2
(45) Date of Patent: Feb. 1, 2022

(54) FUEL PUMP WITH VAPOR PURGE VALVE ASSEMBLY

(71) Applicant: DELPHI TECHNOLOGIES IP LIMITED, St. Michael (BB)

(72) Inventors: Conrado Carrillo, Chihuahua (MX); Victor A. Schiaffino, Chihuahua (MX); Carla P. Lara, Chihuahua (MX); Alejandro Moreno, El Paso, TX (US)

(73) Assignee: DELPHI TECHNOLOGIES IP LIMITED

( * ) Notice: Subject to any disclaimer, the term of this patent is extended or adjusted under 35 U.S.C. 154(b) by 328 days.

(21) Appl. No.: 16/364,462

(22) Filed: Mar. 26, 2019

(65) Prior Publication Data

US 2020/0309075 A1    Oct. 1, 2020

(51) Int. Cl.
| | |
|---|---|
| *F02M 37/20* | (2006.01) |
| *F02M 55/00* | (2006.01) |
| *F02M 37/08* | (2006.01) |
| *F04D 9/00* | (2006.01) |
| *F16K 24/04* | (2006.01) |
| *F04B 53/06* | (2006.01) |

(52) U.S. Cl.
CPC .......... *F02M 55/007* (2013.01); *F02M 37/08* (2013.01); *F02M 37/20* (2013.01); *F04D 9/006* (2013.01); *F04B 53/06* (2013.01); *F16K 24/046* (2013.01)

(58) Field of Classification Search
CPC ...... F16K 24/046; F16K 24/042; F16K 15/04; F16K 15/042; F04D 9/00; F04D 9/006; F04D 9/06; F02M 55/007; F02M 37/20; F02M 37/025; F02M 37/106; F02M 37/54; F04B 53/06

See application file for complete search history.

(56) References Cited

U.S. PATENT DOCUMENTS

| | | | | |
|---|---|---|---|---|
| 1,901,217 | A * | 3/1933 | Yerkes | F16K 15/04 137/533.13 |
| 3,491,790 | A * | 1/1970 | Sanford | F16K 15/04 137/533.11 |
| 4,071,045 | A * | 1/1978 | Brandt | F16K 15/04 137/528 |
| 4,155,374 | A * | 5/1979 | Diehl | F16K 15/04 137/519.5 |
| 4,201,626 | A * | 5/1980 | Asdigian | B01D 11/043 137/533.13 |

(Continued)

*Primary Examiner* — Devon C Kramer
*Assistant Examiner* — Thomas Fink
(74) *Attorney, Agent, or Firm* — Joshua M. Hines

(57) ABSTRACT

A fuel pump includes a housing which is tubular; an inlet plate closes one end of the housing and an end cap closes the other end of the housing. The end cap includes an outlet passage and a vapor purge passage. An electric motor within the housing rotates a pumping element to pump fuel through the fuel pump. A valve assembly of the fuel pump includes a valve member located within the purge passage, the valve member being moveable between a first position which blocks fluid communication therethrough and a second position which provides fluid communication therethrough. A valve retainer fixed to the end cap includes a first leg, a second leg which is opposed to the first leg, and a cross-beam which joins the first leg and the second leg. The valve member is stopped by the cross-beam at the second position.

10 Claims, 8 Drawing Sheets

(56) References Cited

U.S. PATENT DOCUMENTS

| | | | |
|---|---|---|---|
| 4,619,588 A * | 10/1986 | Moore, III | F04C 15/0053 |
| | | | 310/154.14 |
| 4,972,869 A * | 11/1990 | Takasaki | F02M 37/08 |
| | | | 137/199 |
| 5,039,284 A | 8/1991 | Talaski | |
| 5,145,348 A * | 9/1992 | Zumbusch | F04C 15/0076 |
| | | | 418/171 |
| 5,655,892 A | 8/1997 | Cherniawski et al. | |
| 5,823,169 A | 10/1998 | Strohl et al. | |
| 6,824,361 B2 | 11/2004 | Yu et al. | |
| 8,939,736 B2 | 1/2015 | Israelson et al. | |
| 2015/0282662 A1* | 10/2015 | Levine | F16K 15/048 |
| | | | 426/433 |
| 2018/0017028 A1* | 1/2018 | Kalyuta | F04F 5/46 |

\* cited by examiner

FUEL PUMP WITH VAPOR PURGE VALVE ASSEMBLY

TECHNICAL FIELD OF INVENTION

The present invention relates to a fuel pump; more particularly to a fuel pump with a vapor purge valve assembly which allows fuel vapor to be purged from the fuel pump.

BACKGROUND OF INVENTION

Fuel pumps for pumping fuel, for example, from a fuel tank of a motor vehicle to an internal combustion engine of the motor vehicle, are known. U.S. Pat. No. 6,824,361 to Yu et al. shows a typical electric fuel pump which includes an impeller located axially between stationary inlet and outlet plates. It is known that when such fuel pumps are not operating, fuel vapor may accumulate within the fuel pump. This accumulation of fuel vapor increases the time taken to build pressure when operation of the fuel pump is commenced. So-called start-stop applications where the internal combustion engine of the motor vehicle is stopped to reduce idle time of the internal combustion engine, for example at stop lights, may be particularly problematic because the driver of the motor vehicle expects a quick restart of the internal combustion engine when commanded, and the restart can be delayed due to accumulation of fuel vapor. One solution that has been used to purge fuel vapor is a fixed purge orifice which allows fuel vapor to be purged directly to the fuel tank, however, this known fixed purge orifice is parasitic since a small portion of the fuel pumped by the fuel pump is passed through the fixed purge orifice during its entire operating time, thereby reducing efficiency. Furthermore, this known fixed purge orifice only purges fuel vapor from the pump section and not from areas closer to the outlet of the fuel pump, and consequently, does not address all fuel vapor that has accumulated.

U.S. Pat. No. 8,939,736 to Israelson et al. discloses another solution for purging the fuel vapor. Israelson et al. discloses a purge passage with a vent valve which is moved between two seats. When the vent valve is in the downward position when the fuel pump is not operating, fluid communication through the purge passage is prevented due to the vent valve being seated on a lower seat and blocking the purge passage. Next, when operation of the fuel pump is commenced, the vent valve lifts off of the lower seat by fuel pressure and moves toward the upper seat. Fuel vapor is allowed to be purged to the fuel tank when the vent valve is not seated on either of the upper seat or the lower seat. Finally, when the vent valve seats with the upper seat, fluid communication through the purge passage is again prevented. While the vent valve of Israelson et al. may be effective for purging fuel vapor, if such a vent valve is arranged in a fuel pump with a passage which is dedicated to supplying pressurized fuel to a jet pump which is used to refill a fuel reservoir or which is used to draw fuel from a saddle tank, a siphon can be generated when the fuel pump is not operating and the fuel within the fuel reservoir can be siphoned through the passage supplying fuel to the jet pump. In order to resolve the siphoning issue, it has been known to provide a check valve in the passage which supplies the jet pump, however, this adds components and reduces the efficiency of the jet pump.

What is needed is a fuel pump which minimizes or eliminates one or more of the shortcomings as set forth above.

SUMMARY OF THE INVENTION

Briefly described, a fuel pump includes a housing which is tubular and extends from a housing inlet end to a housing outlet end; an inlet plate closing the housing inlet end of the housing, the inlet plate having an inlet passage which provides fluid communication into the housing; an end cap which closes the housing outlet end of the housing, the end cap having an outlet passage which provides fluid communication out of the housing and also having a vapor purge passage which selectively provides fluid communication out of the housing; an electric motor within the housing between the inlet plate and the end cap, the electric motor having a shaft which rotates about an axis; a pumping element rotationally coupled to the shaft such that rotation of the pumping element by the shaft causes fluid to be pumped from the inlet passage to the outlet passage and to be pressurized within the housing; and a vapor purge valve assembly. The vapor purge valve assembly includes a vapor purge valve member located within the vapor purge passage, the vapor purge valve member being moveable between 1) a first position which blocks fluid communication through the vapor purge passage and 2) a second position which provides fluid communication through the vapor purge passage; and a vapor purge valve retainer fixed to the end cap, the vapor purge valve retainer having a first leg, a second leg which is opposed to the first leg, and a cross-beam which joins the first leg and the second leg, wherein the vapor purge valve member is stopped by the cross-beam at the second position. The fuel pump with vapor purge valve assembly as disclosed herein provides simplicity and cost effectiveness in manufacture, minimizes flow restriction, provides superior positioning of a vapor purge valve member, prevents contamination due to debris from the manufacturing processes, and prevents siphoning when a jet pump is used with the fuel pump.

BRIEF DESCRIPTION OF DRAWINGS

This invention will be further described with reference to the accompanying drawings in which.

DETAILED DESCRIPTION OF INVENTION

Figure 1:
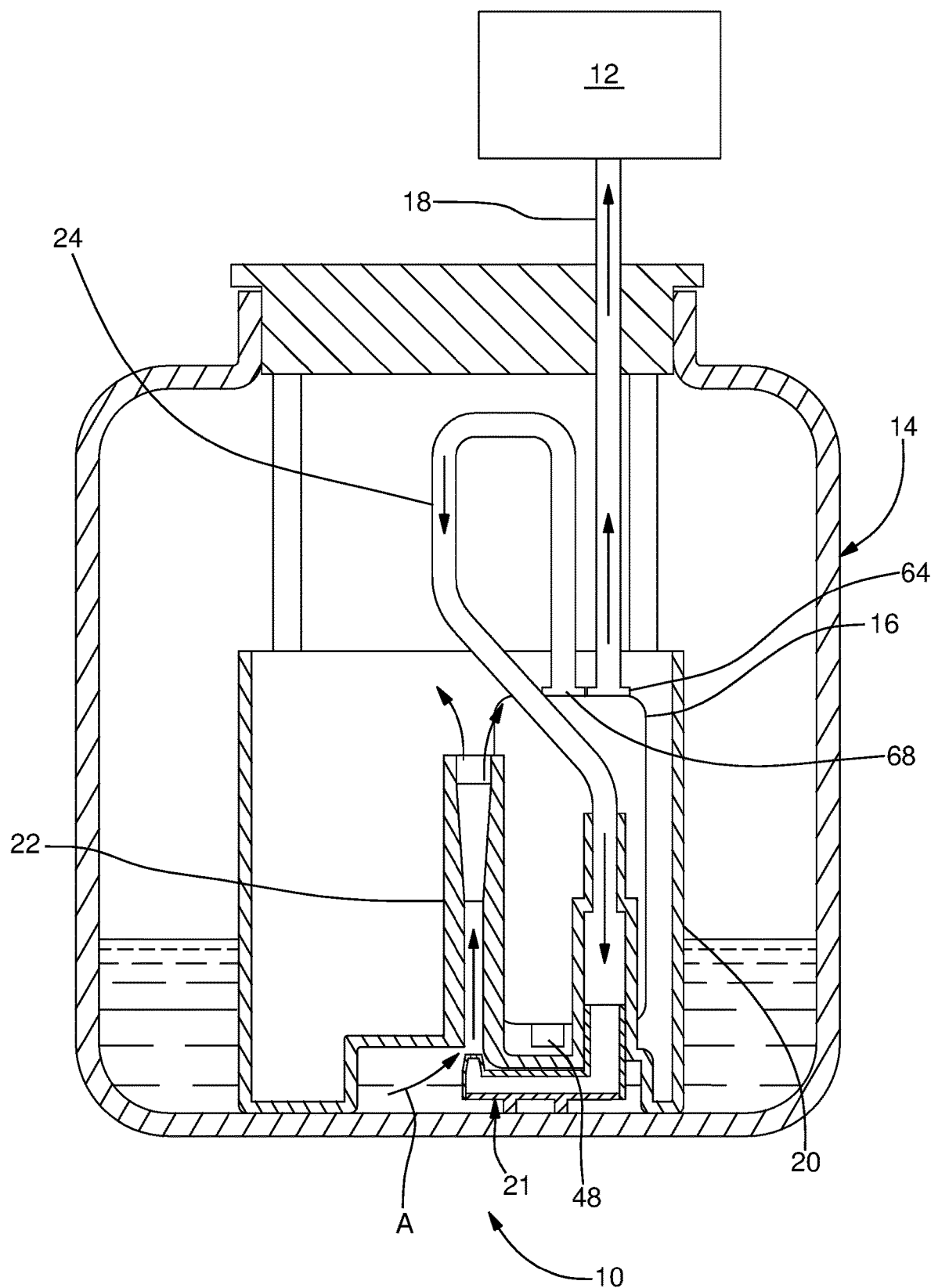
FIG. 1 is a schematic view of a fuel system in accordance with the present disclosure.

Referring initially to FIG. 1, a fuel system 10 is shown in accordance with the invention for supplying fuel to a fuel consuming device, illustrated by way of non-limiting example only, as an internal combustion engine 12. The fuel of fuel system 10 may be any liquid fuel customarily used, for example only, gasoline, diesel fuel, alcohol, ethanol, and the like, and blends thereof.

Fuel system 10 includes a fuel tank 14 for storing a quantity of fuel and a fuel pump 16 for pumping fuel from fuel tank 14 to internal combustion engine 12. Fuel that is pumped by fuel pump 16 is communicated to internal combustion engine 12 through a fuel supply line 18. Fuel pump 16 is an electric fuel pump which will be described in greater detail later. Fuel pump 16 is disposed within a fuel reservoir 20 which is a separate container within fuel tank 14 that is filled with fuel from fuel tank 14. When the fuel level in fuel tank 14 is sufficiently high, fuel reservoir 20 is filled by fuel simply spilling over the top of fuel reservoir 20. However, when the fuel level in fuel tank 14 is not sufficiently high to spill over the top of fuel reservoir 20, fuel reservoir 20 is filled by supplying a portion of the fuel flow from fuel pump 16 to a jet pump 21 through a jet pump supply line 24. Jet pump 21 directs a stream of fuel into a fuel reservoir refill tube 22, the lower end of which is open to fuel tank 14. The stream of fuel that is directed into fuel reservoir refill tube 22 creates a venturi effect which draws fuel (indicated by fuel flow arrow A) from fuel tank 14 (and outside of fuel reservoir 20) into fuel reservoir refill tube 22 where the fuel is directed into fuel reservoir 20. Jet pumps and their corresponding operation are known to those of ordinary skill in the art of fuel systems and will not be described further herein.

Figure 2:
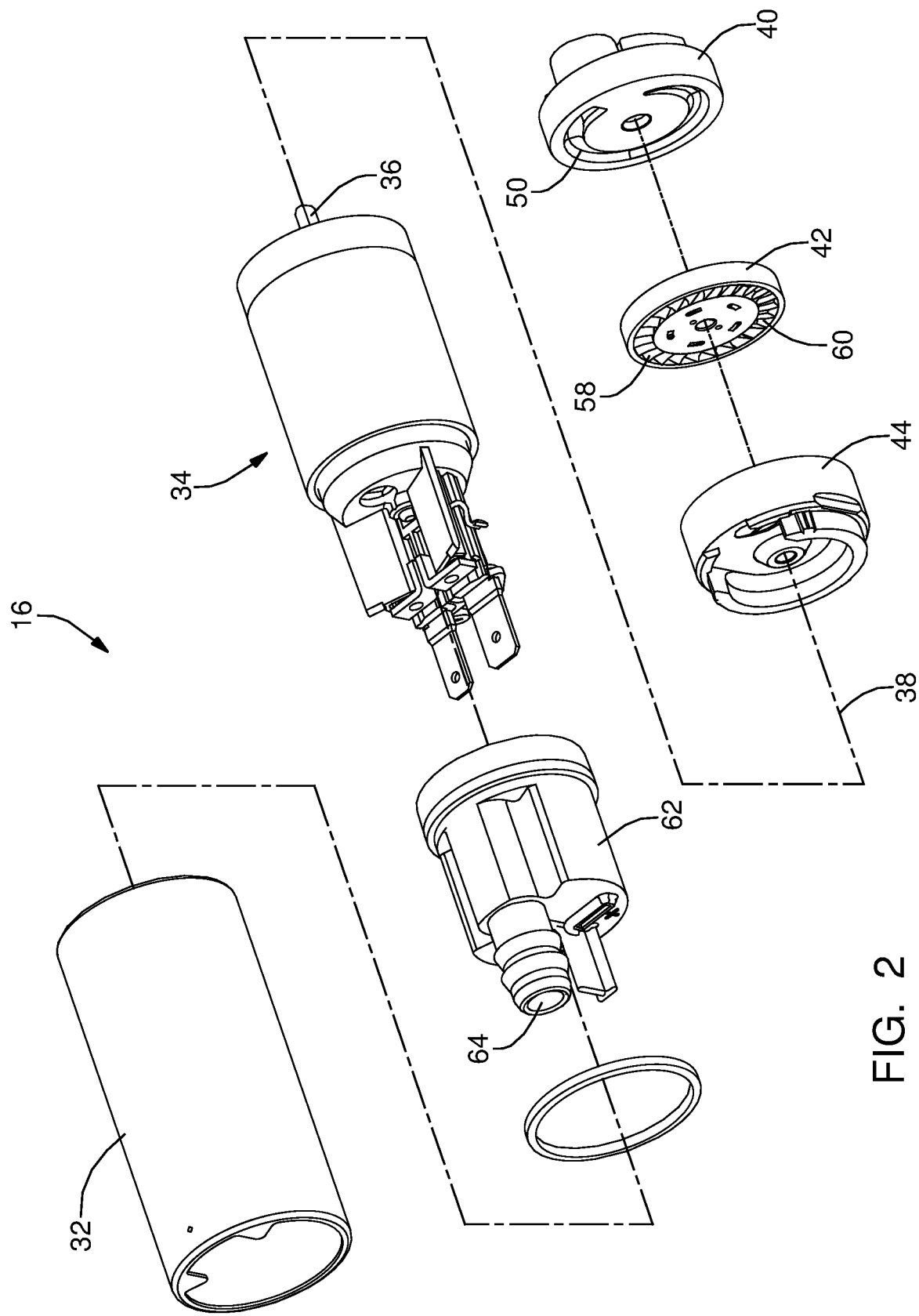
FIG. 2 is an exploded isometric view of a fuel pump in accordance with the present disclosure.
Figure 3:
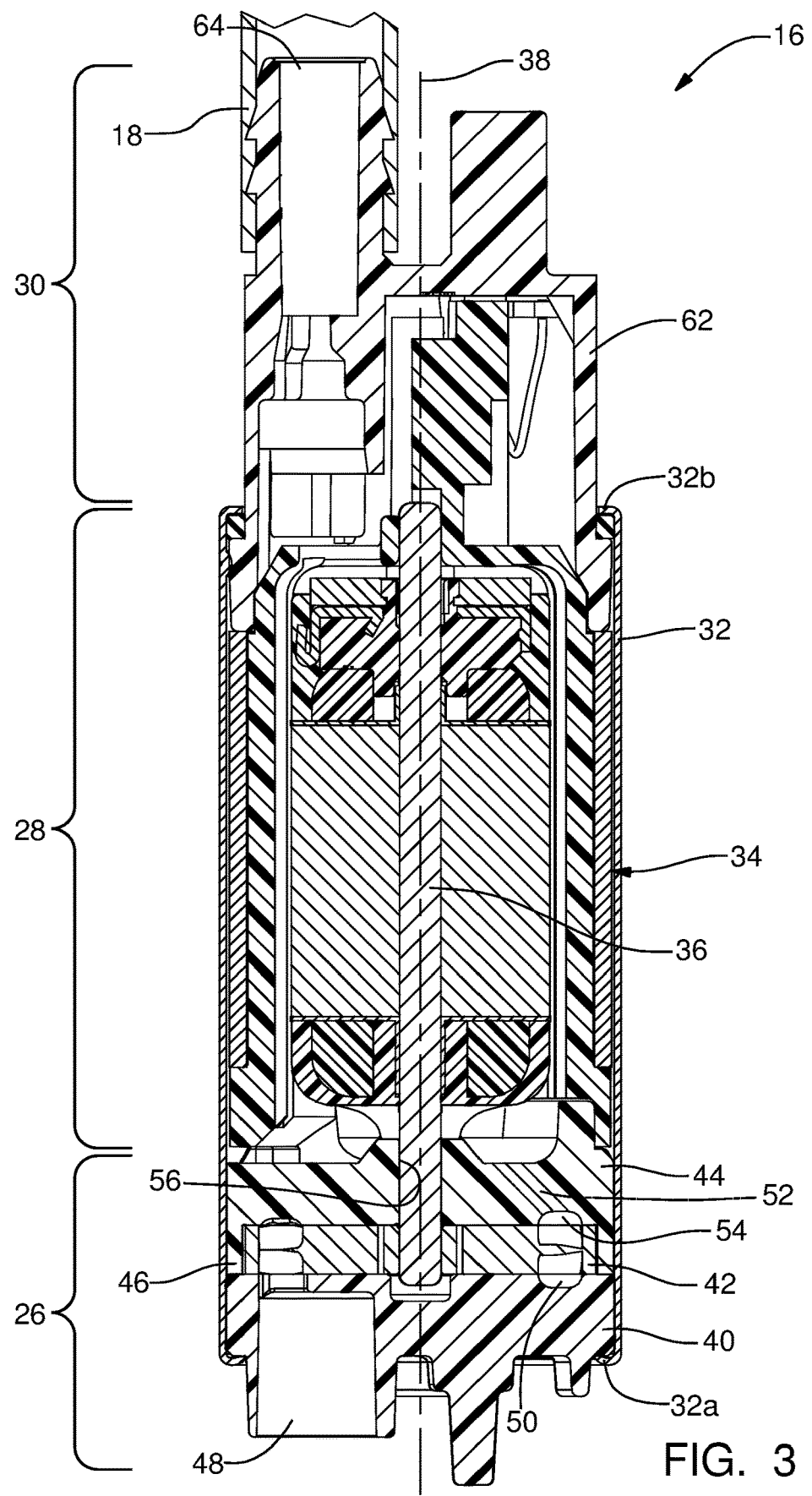
FIG. 3 is an axial cross-sectional view of the fuel pump of FIG. 2.

Reference will now be made to FIGS. 2 and 3 which are an exploded isometric view and an axial cross-sectional view respectively of fuel pump 16. Fuel pump 16 generally includes a pump section 26 at one end, a motor section 28 adjacent to pump section 26, and an outlet section 30 adjacent to motor section 28 at the end of fuel pump 16 opposite pump section 26. A housing 32 of fuel pump 16 is tubular, extends from a housing inlet end 32a to a housing outlet end 32b, and retains pump section 26, motor section 28 and outlet section 30 together. Fuel enters fuel pump 16 at pump section 26, a portion of which is rotated by motor section 28 as will be described in more detail later, and is pumped past motor section 28 to outlet section 30 where the fuel exits fuel pump 16.

Motor section 28 includes an electric motor 34 which is disposed within housing 32. Electric motor 34 includes a shaft 36 extending therefrom into pump section 26. Shaft 36 rotates about an axis 38 when an electric current is applied to electric motor 34. Electric motors and their operation are well known to those of ordinary skill in the art and will not be described in greater detail herein.

With continued reference to FIGS. 2 and 3, pump section 26 includes an inlet plate 40, a pumping element illustrated as impeller 42, and an outlet plate 44. Inlet plate 40 is disposed at the end of pump section 26 that is distal from motor section 28 while outlet plate 44 is disposed at the end of pump section 26 that is proximal to motor section 28. Both inlet plate 40 and outlet plate 44 are fixed relative to housing 32 to prevent relative movement between inlet plate 40 and outlet plate 44 with respect to housing 32. Outlet plate 44 defines a spacer ring 46 on the side of outlet plate 44 that faces toward inlet plate 40. Impeller 42 is disposed axially between inlet plate 40 and outlet plate 44 such that impeller 42 is radially surrounded by spacer ring 46. Impeller 42 is fixed to shaft 36 such that impeller 42 rotates with shaft 36 in a one-to-one relationship. Spacer ring 46 is dimensioned to be slightly thicker than the dimension of impeller 42 in the direction of axis 38, i.e. the dimension of spacer ring 46 in the direction of axis 38 is greater than the dimension of impeller 42 in the direction of axis 38. In this way, inlet plate 40, outlet plate 44, and spacer ring 46 are fixed within housing 32, for example by crimping the axial ends of housing 32. Axial forces created by the crimping process will be carried by spacer ring 46, thereby preventing impeller 42 from being clamped tightly between inlet plate 40 and outlet plate 44 which would prevent impeller 42 from rotating freely. Spacer ring 46 is also dimensioned to have an inside diameter that is larger than the outside diameter of impeller 42 to allow impeller 42 to rotate freely within spacer ring 46 and axially between inlet plate 40 and outlet plate 44. While the pumping element has been illustrated as impeller 42, it should now be understood that other pumping elements may alternatively be used, by way of non-limiting example only, a gerotor, gears, or roller vanes. Furthermore, while spacer ring 46 is illustrated as being made as a single piece with outlet plate 44, it should be understood that spacer ring 46 may alternatively be made as a separate piece that is captured axially between outlet plate 44 and inlet plate 40.

Inlet plate 40 is generally cylindrical in shape, and includes an inlet passage 48 that extends through inlet plate 40 in the same direction as axis 38. Inlet passage 48 is a passage which introduces fuel into fuel pump 16/housing 32. Inlet plate 40 also includes an inlet plate flow channel 50 formed in the face of inlet plate 40 that faces toward impeller 42. Inlet plate flow channel 50 is in fluid communication with inlet passage 48.

Outlet plate 44 is generally cylindrical in shape and includes an outlet plate outlet passage 52 that extends through outlet plate 44 where it should be noted that outlet plate outlet passage 52 is an outlet for pump section 26. Outlet plate outlet passage 52 is in fluid communication with outlet section 30. Outlet plate 44 also includes an outlet plate flow channel 54 formed in the face of outlet plate 44 that faces toward impeller 42. Outlet plate flow channel 54 is in fluid communication with outlet plate outlet passage 52. Outlet plate 44 also includes an outlet plate aperture, hereinafter referred to as lower bearing 56, extending through outlet plate 44. Shaft 36 extends through lower bearing 56 in a close fitting relationship such that shaft 36 is able to rotate freely within lower bearing 56 and such that radial movement of shaft 36 within lower bearing 56 is limited to the manufacturing tolerances of shaft 36 and lower bearing 56. In this way, lower bearing 56 radially supports a lower end of shaft 36 that is proximal to pump section 26.

Impeller 42 includes a plurality of impeller blades 58 arranged in a polar array radially surrounding and centered about axis 38 such that impeller blades 58 are aligned with inlet plate flow channel 50 and outlet plate flow channel 54. Impeller blades 58 are each separated from each other by an impeller blade chamber 60 that passes through impeller 42 in the general direction of axis 38. Impeller 42 may be made, for example only, by a plastic injection molding process in which the preceding features of impeller 42 are integrally molded as a single piece of plastic.

With continued reference to FIGS. 2 and 3 and now with additional reference to FIGS. 4-7, outlet section 30 includes an end cap 62 which closes off housing outlet end 32b. End cap 62 includes an outlet passage 64 which provides fluid communication out of housing 32 such that outlet passage 64 is in fluid communication with outlet plate outlet passage 52 of outlet plate 44 for receiving fuel that has been pumped by pump section 26. Rotation of impeller 42 by shaft 36 causes fluid to be pumped from inlet passage 48 to outlet passage 64 and to be pressurized within housing 32. Fuel supply line 18 is connected to outlet passage 64, thereby supplying fuel to internal combustion engine 12. End cap 62 also includes a vapor purge passage 66, only visible in FIGS. 4-5A, which provides selective fluid communication out of housing 32 to the interior of fuel tank 14. End cap 62 also includes a jet pump passage 68, only visible in FIGS. 1 and 5, which provides fluid communication out of housing 32 and which is fluidly connected to jet pump supply line 24, thereby supply pressurized fuel to jet pump 21 for operation thereof.

Figure 5:
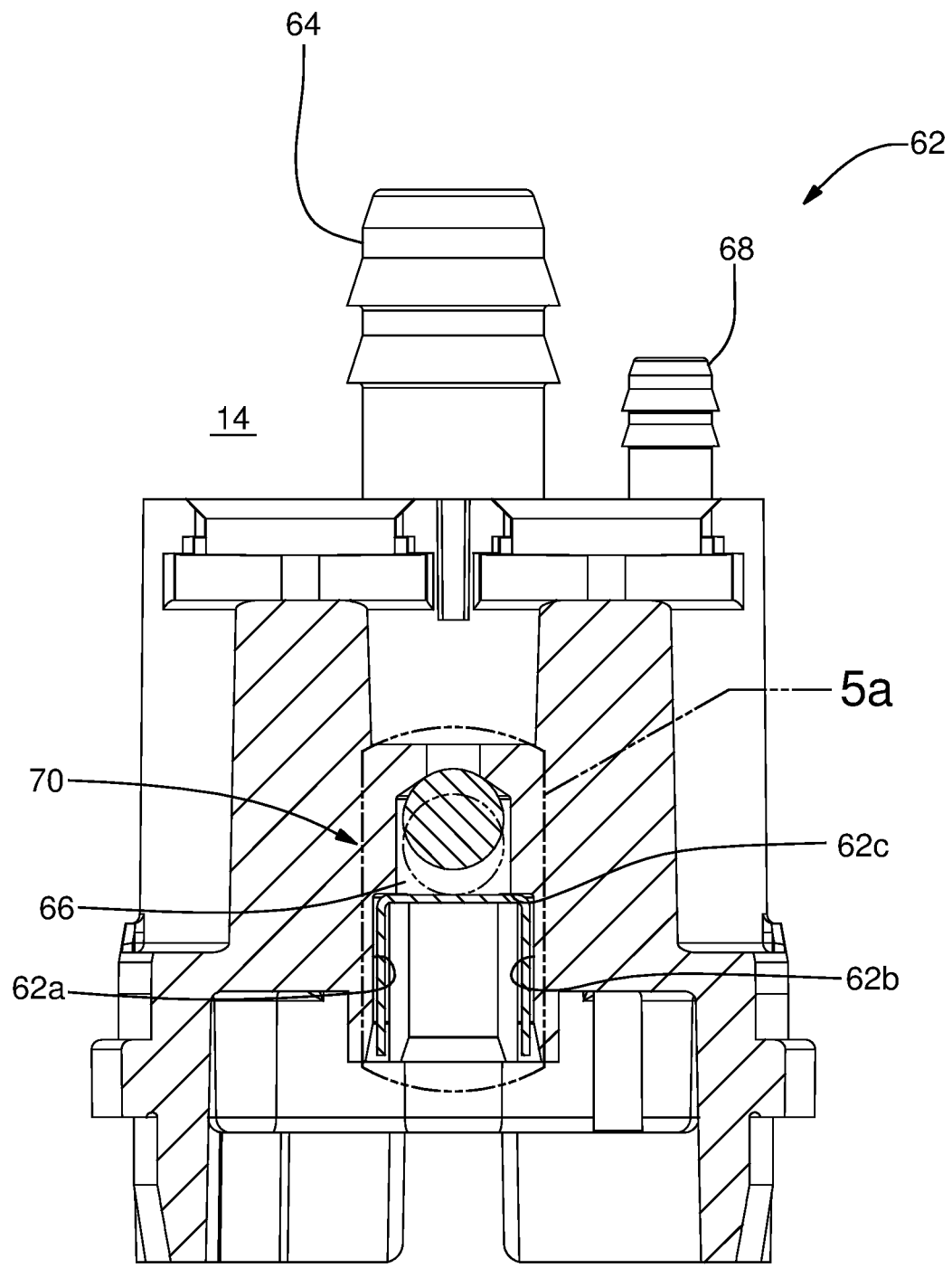
FIG. 5 is a cross-sectional view of the end cap of FIG. 4, taken through section line 5-5.
Figure 5A:
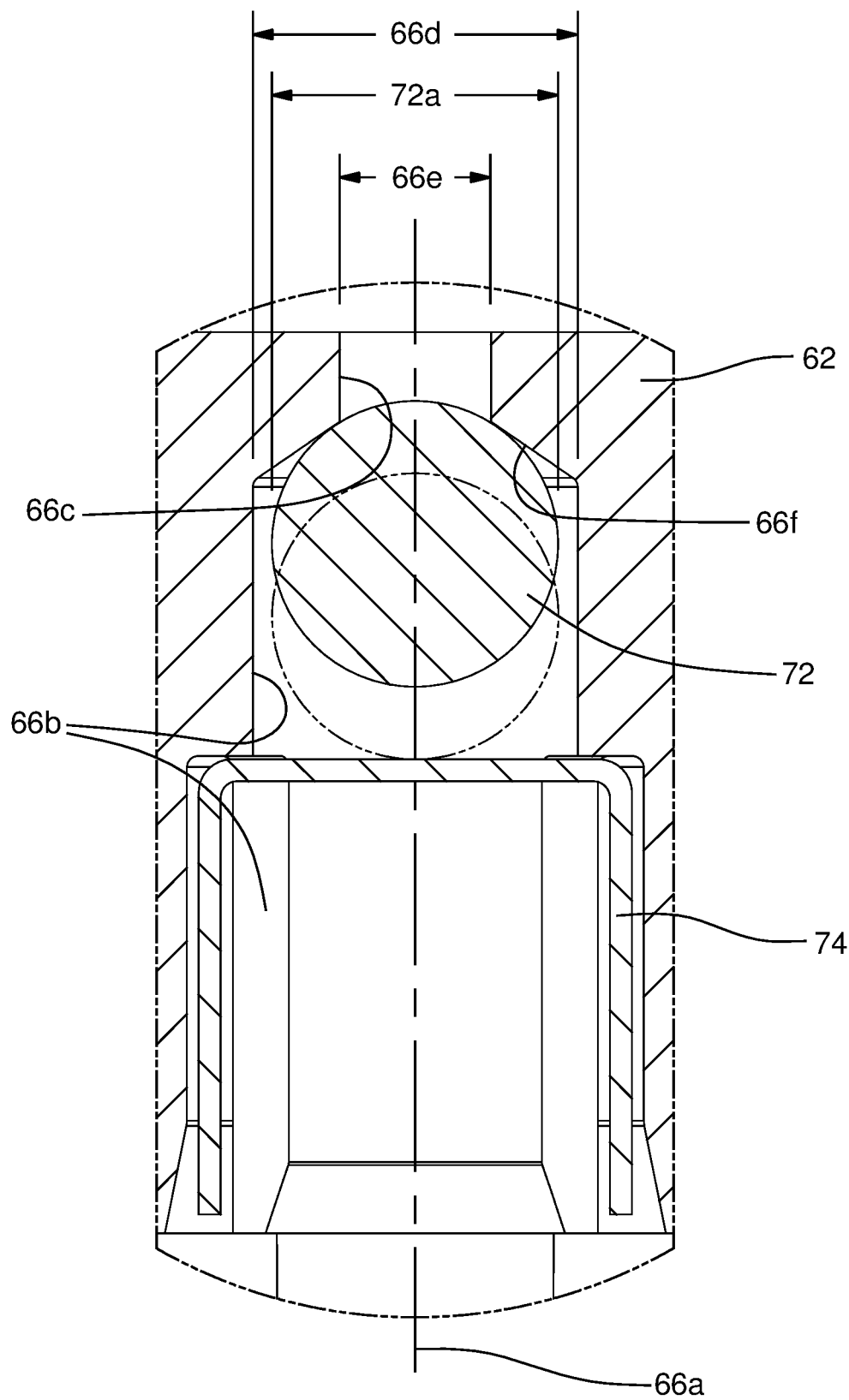
FIG. 5A is an enlarged portion of FIG. 5.

Vapor purge passage 66 extends through end cap 62 such that vapor purge passage 66 is centered about, and extends along, a vapor purge passage axis 66a which may be parallel to axis 38. Vapor purge passage 66 includes a vapor purge passage first portion 66b which is proximal to electric motor 34 and a vapor purge passage second portion 66c which is distal from electric motor 34. Vapor purge passage first portion 66b has vapor purge passage first diameter 66d which is greater than a vapor purge passage second diameter 66e of vapor purge passage second portion 66c, thereby defining a vapor purge passage shoulder 66f which joins vapor purge passage first portion 66b and vapor purge passage second portion 66c. As illustrated in FIGS. 5 and 5A, vapor purge passage shoulder 66f may be frustoconical in shape and serves as a seating surface as will be described in greater detail later.

Figure 4:
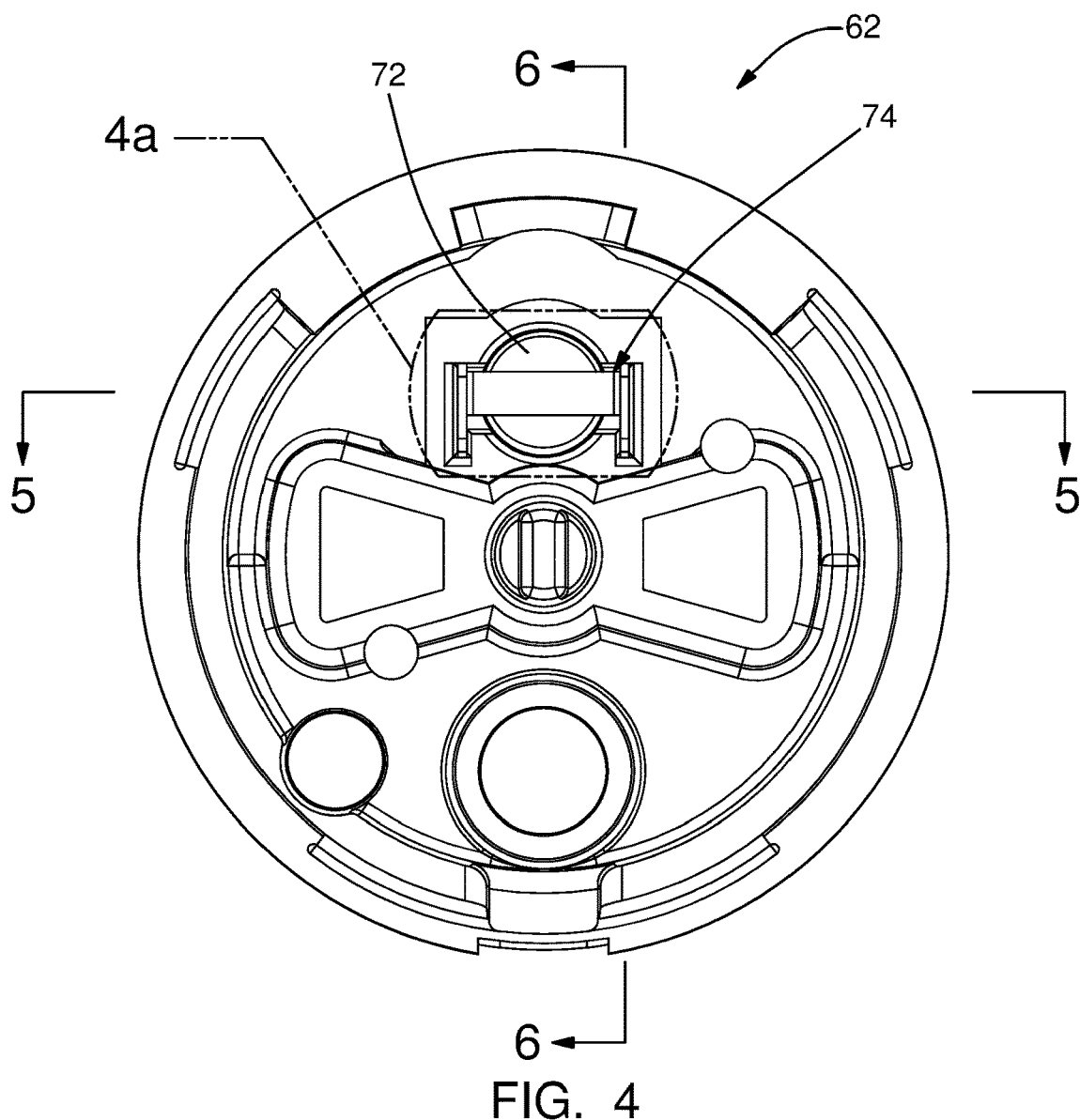
FIG. 4 is an axial elevation view of an end cap of the fuel pump of FIG. 2.
Figure 4A:
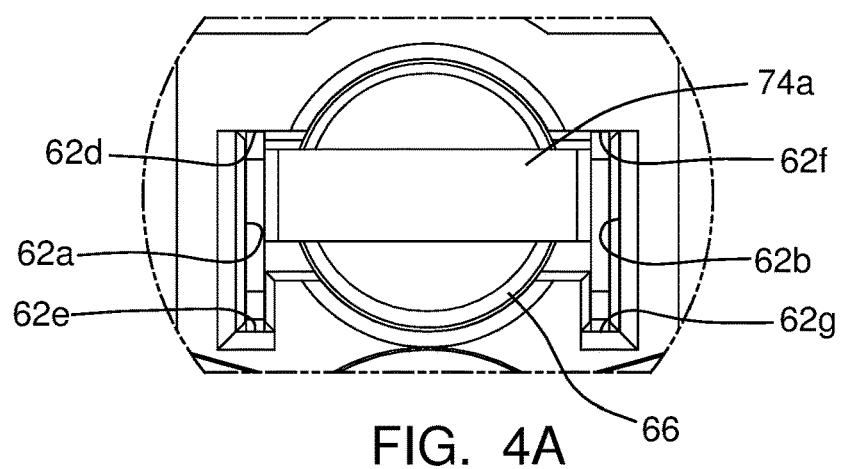
FIG. 4A is an enlarged portion of FIG. 4.
Figure 6:
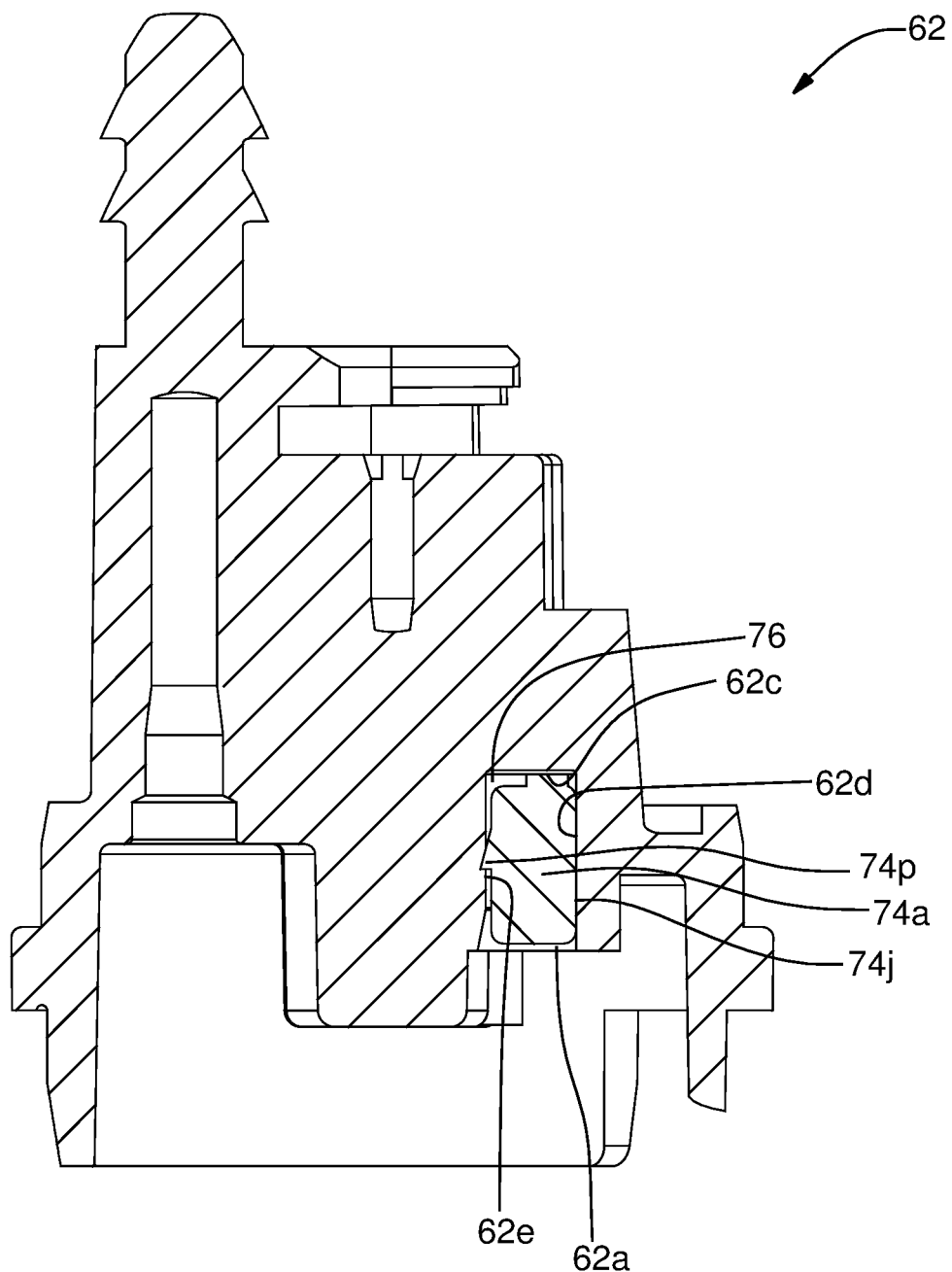
FIG. 6 is a cross-sectional view of the end cap of FIG. 4, taken through section line 6-6.
Figure 7:
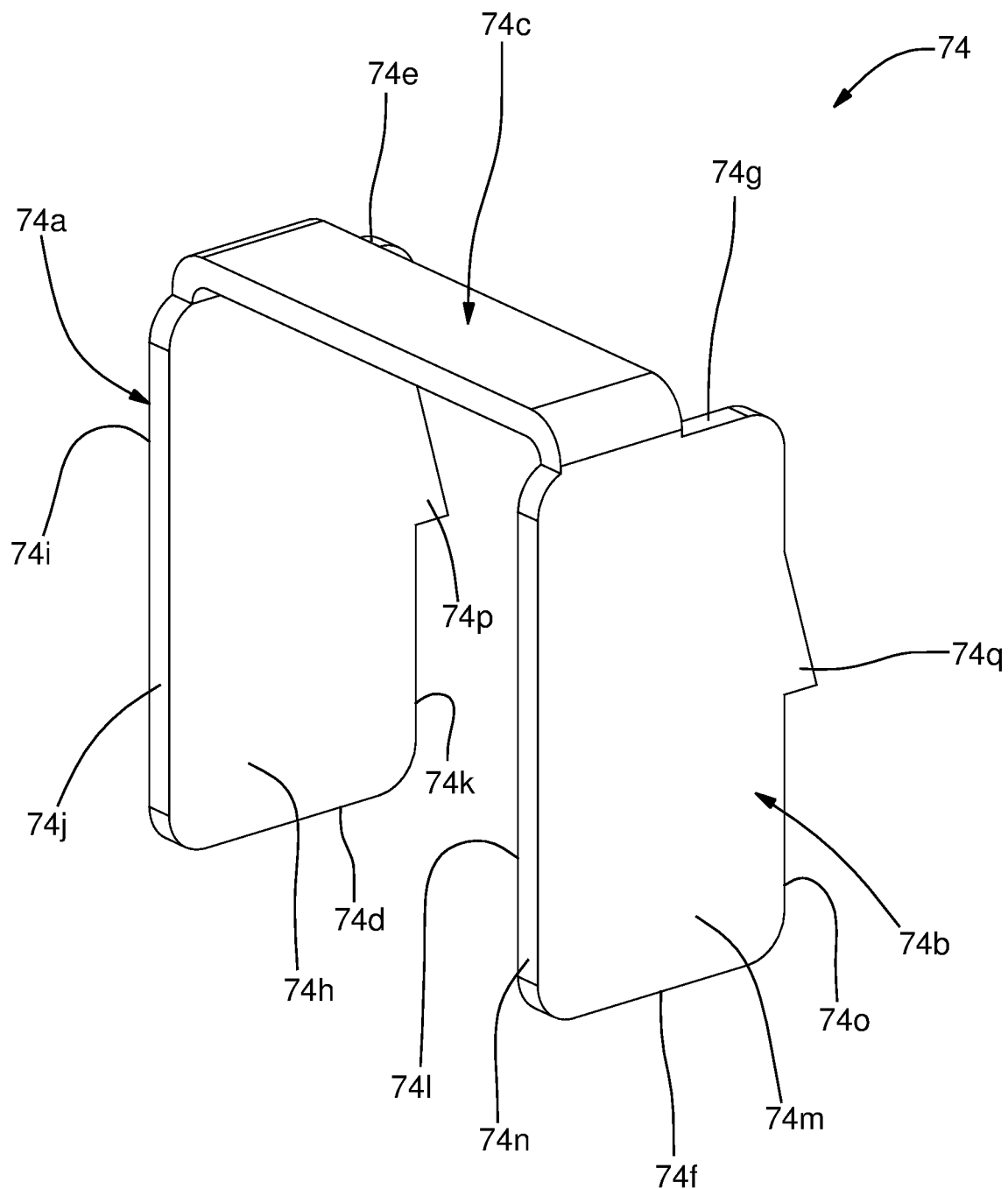
FIG. 7 is an isometric view of a valve purge valve retainer of the fuel pump of FIG. 2.

A vapor purge valve assembly 70, only visible in FIGS. 4-6, is provided in order to selectively provide fluid communication through vapor purge passage 66. More specifically, vapor purge valve assembly 70 allows fluid communication through vapor purge passage 66 prior to operation of fuel pump 16 and for a brief time after fuel pump 16 has been started, but before pressure within housing 32 closes vapor purge valve assembly 70, thereby allowing fuel vapor that may be within housing 32 to be purged directly to the interior of fuel tank 14. However, after pressure within housing 32 closes vapor purge valve assembly 70, fluid communication through vapor purge passage 66 is prevented. Vapor purge valve assembly 70 includes a vapor purge valve member 72 located within vapor purge passage 66 and also includes a vapor purge valve retainer 74 which retains vapor purge valve member 72 within vapor purge passage 66.

Vapor purge valve member 72 may be, as illustrated herein, a ball, i.e. a sphere. Vapor purge valve member 72 is moveable between 1) a first position which blocks fluid communication through vapor purge passage 66 and 2) a second position which provides fluid communication through vapor purge passage 66. Vapor purge valve member 72 has a vapor purge valve member diameter 72a which is greater than vapor purge passage second diameter 66e and which is less than vapor purge passage first diameter 66d. FIG. 5 illustrates vapor purge valve member 72 in solid lines when vapor purge valve member 72 is in the first position and also illustrates vapor purge valve member 72 in phantom lines when vapor purge valve member 72 is in the second position. In use, fuel pump 16 is oriented within fuel tank 14 such that vapor purge passage axis 66a is generally vertical with gravity acting in the downward direction of FIG. 5. Vapor purge passage axis 66a may deviate from vertical to the extent that gravity is still able to move vapor purge valve member 72 to the second position when fuel pump 16 is not operating. In this way, when fuel pump 16 is not operating and fuel pressure within housing 32 drops, gravity allows vapor purge valve member 72 to separate from vapor purge passage shoulder 66f. Conversely, when fuel pump 16 is started, any fuel vapor that may have accumulated within housing 32 is allowed to flow around vapor purge valve assembly 70, through vapor purge passage axis 66a, and into the interior of fuel tank 14 before the pressure within housing 32 forces vapor purge valve member 72 into contact with vapor purge passage shoulder 66f, thereby preventing fluid communication through vapor purge passage 66 and causing all fuel to flow either through outlet passage 64 or jet pump passage 68.

Vapor purge valve retainer 74 is fixed to end cap 62 and includes a first leg 74a, a second leg 74b which is opposed to first leg 74a, and a cross-beam 74c which joins first leg 74a and second leg 74b such that vapor purge passage axis 66a passes through cross-beam 74c. Cross-beam 74c serves to stop vapor purge valve member 72 at the second position such that fluid communication through vapor purge passage 66 is provided around cross-beam 74c until vapor purge valve member 72 is in the first position. Since fluid communication through vapor purge passage 66 is provided when vapor purge valve member 72 is in the second position, an air break is provided which prevents siphoning through jet pump passage 68 when fuel pump 16 is not operating, thereby preventing fuel reservoir 20 from being emptied by siphoning. Vapor purge valve retainer 74 is preferably made of a metal material, for example steel or stainless steel, such that first leg 74a, second leg 74b, and cross-beam 74c are made of a single, unitary piece of material, for example through stamping and bending techniques. First leg 74a extends from a first leg first end 74d which is proximal to electric motor 34 to a first leg second end 74e which is distal from electric motor 34. Similarly, second leg 74b extends from a second leg first end 74f which is proximal to electric motor 34 to a second leg second end 74g which is distal from electric motor 34. Cross-beam 74c joins first leg second end 74e and second leg second end 74g. First leg 74a includes a first leg first face 74h which is planar and faces toward second leg 74b and also includes a first leg second face 74i which is planar, parallel to first leg first face 74h, and opposed to first leg first face 74h. A first leg first edge 74j and a first leg second edge 74k join first leg first face 74h and first leg second face 74i such that first leg first edge 74j and first leg second edge 74k are opposed to each other. Similarly, second leg 74b includes a second leg first face 74l which is planar and faces toward first leg 74a and also includes a second leg second face 74m which is planar, parallel to second leg first face 74l, and opposed to second leg first face 74l. A second leg first edge 74n and a second leg second edge 74o join second leg first face 74l and second leg second face 74m such that second leg first edge 74n and second leg second edge 74o are opposed to each other. First leg second edge 74k includes a first barb 74p extending outward therefrom such that first barb 74p is tapered so as to increase in size in a direction from first leg second end 74e toward first leg first end 74d. Similarly, second leg second edge 74o includes a second barb 74q extending outward therefrom such that second barb 74q is tapered so as to increase in size in a direction from second leg second end 74g toward second leg first end 74f.

In order to fix vapor purge valve retainer 74 to end cap 62, end cap 62 includes a first retention slot 62a within which first leg 74a is located and also includes a second retention slot 62b within which second leg 74b is located such that first retention slot 62a and second retention slot 62b are separated from each other by vapor purge passage 66. First retention slot 62a and second retention slot 62b are terminated by a retention slot end wall 62c formed by end cap 62 such that cross-beam 74c of vapor purge valve retainer 74 abuts retention slot end wall 62c. In this way, retention slot end wall 62*c* sets the position of vapor purge valve retainer 74 and allows accurate positioning of cross-beam 74*c* relative to vapor purge passage shoulder 66*f*, thereby accurately setting the distance that vapor purge valve member 72 moves between the first position and the second position. First leg first edge 74*j* and first barb 74*p* engage opposing surfaces 62*d*, 62*e* respectively of first retention slot 62*a* such that first barb 74*p* grips its respective surface of first retention slot 62*a* and such that the tapered nature of first barb 74*p* allows vapor purge valve retainer 74 to be easily installed but prevents removal. Similarly, second leg first edge 74*n* and second barb 74*q* engage opposing surfaces 62*f*, 62*h* respectively of second retention slot 62*b* such that second barb 74*q* grips its respective surface of second retention slot 62*b* and such that the tapered nature of second barb 74*q* allows vapor purge valve retainer 74 to be easily installed but prevents removal. During installation, first leg first edge 74*j* slides on surface 62*d* of first retention slot 62*a* and second leg first edge 74*n* slides on surface 62*f* of second retention slot 62*b* which prevents vapor purge valve retainer 74 and guarantees that cross-beam 74*c* is square to retention slot end wall 62*c* when they contact. During installation, first barb 74*p* and second barb 74*q* may generate debris by scraping against the surfaces of end cap 62 that define first retention slot 62*a* and second retention slot 62*b*. However, this debris is captured within debris traps 76 that are located axially between first barb 74*p* and retention slot end wall 62*c* and axially between second barb 74*q* and retention slot end wall 62*c*. Consequently, the debris is captured and prevented from contaminating any portion of the fuel circuit, i.e. fuel tank, fuel injectors, etc. End cap 62 is preferably made of a plastic material formed in an injection molding process which allows each of the foregoing features to be formed during the injection molding processes.

Vapor purge valve assembly 70 as described herein, provides for better functionality compared to the prior art and is also simple and cost efficient to manufacture. More specifically, flow restriction is minimized by allowing flow around cross-beam 74*c*. Also more specifically, cross-beam 74*c* provides superior positioning for vapor purge valve member 72. Also more specifically, contamination is controlled during installation of vapor purge valve retainer 74 by capturing any contamination produced by first barb 74*p* and second barb 74*q* in debris traps 76. Also more specifically, vapor purge valve assembly 70 provides an air break which prevents siphoning through jet pump passage 68 when fuel pump 16 is not operating, thereby eliminating the need for a check valve in jet pump passage 68 or jet pump supply line 24 which would lead to decreased efficiency of jet pump 21.

While this invention has been described in terms of preferred embodiments thereof, it is not intended to be so limited, but rather only to the extent set forth in the claims that follow.

We claim:
1. A fuel pump comprising:
a housing which is tubular and extends from a housing inlet end to a housing outlet end;
an inlet plate closing said housing inlet end of said housing, said inlet plate having an inlet passage which provides fluid communication into said housing;
an end cap which closes said housing outlet end of said housing, said end cap having an outlet passage which provides fluid communication out of said housing and also having a vapor purge passage which selectively provides fluid communication out of said housing;
an electric motor within said housing between said inlet plate and said end cap, said electric motor having a shaft which rotates about an axis;
a pumping element rotationally coupled to said shaft such that rotation of said pumping element by said shaft causes fluid to be pumped from said inlet passage to said outlet passage and to be pressurized within said housing; and
a vapor purge valve assembly, said vapor purge valve assembly comprising:
a vapor purge valve member located within said vapor purge passage, said vapor purge valve member being moveable between 1) a first position which blocks fluid communication through said vapor purge passage and 2) a second position which provides fluid communication through said vapor purge passage; and
a vapor purge valve retainer fixed to said end cap, said vapor purge valve retainer having a first leg, a second leg which is opposed to said first leg, and a cross-beam which joins said first leg and said second leg, wherein said vapor purge valve member is stopped by said cross-beam at said second position
wherein said end cap includes a first retention slot within which said first leg is located;
wherein said end cap includes a second retention slot within which said second leg is located; and
wherein said first retention slot and said second retention slot are separated by said vapor purge passage.
2. A fuel pump as in claim 1, wherein:
said first leg extends from a first leg first end which is proximal to said electric motor to a first leg second end which is distal from said electric motor;
said second leg extends from a second leg first end which is proximal to said electric motor to a second leg second end which is distal from said electric motor; and
said cross-beam joins said first leg second end and said second leg second end.
3. A fuel pump as in claim 2, wherein:
said vapor purge passage is centered about, and extends along, a vapor purge passage axis; and
said vapor purge passage axis extends through said cross-beam.
4. A fuel pump as in claim 1, wherein:
said first leg includes a first barb which engages a surface of said first retention slot;
said second leg includes a second barb which engages a surface of said second retention slot; and
said first barb and said second barb retain said vapor purge valve retainer to said end cap.
5. A fuel pump as in claim 1, wherein
said first leg includes a first leg first edge and a first leg second edge which is opposed to said first leg second edge, said first leg second edge including a first barb such that said first leg first edge and said first barb engage opposing surfaces of said first retention slot;
said second leg includes a second leg first edge and a second leg second edge which is opposed to said second leg second edge, said second leg second edge including a second barb such that said second leg first edge and said second barb engage opposing surfaces of said first retention slot; and
said first barb and said second barb retain said vapor purge valve retainer to said end cap.

6. A fuel pump as in claim 5, wherein:
said first leg includes a first leg first face which faces toward said second leg and also includes a first leg second face which is opposed to said first leg first face;
said first leg first edge and said first leg second edge join said first leg first face and said first leg second face;
said second leg includes a second leg first face which faces toward said first leg and also includes a second leg second face which is opposed to said second leg first face; and
said second leg first edge and said second leg second edge join said second leg first face and said second leg second face.

7. A fuel pump as in claim 1, wherein:
said first retention slot and said second retention slot are terminated by a retention slot end wall of said end cap; and
said cross-beam of said vapor purge valve retainer abuts said retention slot end wall.

8. A fuel pump as in claim 1, wherein;
said first retention slot and said second retention slot are terminated by a retention slot end wall of said end cap;
said first leg includes a first barb which engages a surface of said first retention slot;
said second leg includes a second barb which engages a surface of said second retention slot; and
debris traps are formed between said first barb and said retention slot end wall and between said second barb and said retention slot end wall such that said debris traps capture debris resulting from scraping of said first barb and said second barb against surfaces of said first retention slot and said second retention slot when said vapor purge valve retainer is installed.

9. A fuel pump as in claim 8, wherein:
said first leg extends from a first leg first end which is proximal to said electric motor to a first leg second end which is distal from said electric motor;
said second leg extends from a second leg first end which is proximal to said electric motor to a second leg second end which is distal from said electric motor;
said cross-beam joins said first leg second end and said second leg second end;
said first barb is tapered so as to increase in size in a direction from said first leg second end toward said first leg first end; and
said second barb is tapered so as to increase in size in a direction from said second leg second end toward said second leg first end.

10. A fuel pump as in claim 1, wherein:
said end cap includes a jet pump passage which provides fluid communication out of said housing; and
said second position of said vapor purge valve member prevents siphoning through said jet pump passage.

* * * * *